United States Patent
Grzegorzewska et al.

(10) Patent No.: US 7,281,856 B2
(45) Date of Patent: Oct. 16, 2007

(54) INDUSTRIAL OPTICAL FIBER CONNECTOR ASSEMBLY

(75) Inventors: Barbara Grzegorzewska, Riverside, IL (US); David S. Rifkin, Aurora, IL (US); Ilya Makhlin, Wheeling, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/311,501

(22) Filed: Dec. 19, 2005

(65) Prior Publication Data

US 2007/0036487 A1    Feb. 15, 2007

(51) Int. Cl.
G02B 6/36 (2006.01)
(52) U.S. Cl. .............................. 385/53; 385/76; 385/88; 385/92
(58) Field of Classification Search .................... 385/53
See application file for complete search history.

(56) References Cited

U.S. PATENT DOCUMENTS 5,671,310 A * 9/1997 Lin et al. ....................... 385/78
5,748,819 A * 5/1998 Szentesi et al. ............... 385/60

* cited by examiner

Primary Examiner—Jennifer Doan
(74) Attorney, Agent, or Firm—Charles S. Cohen

(57) ABSTRACT

A sealed optical fiber connector assembly includes a connector housing that is uniquely configured to cooperate with a cable crimp tail and one or more terminal fiber optic connectors. The connector housing has a first opening for securely retaining the terminal fiber optic connectors. An interior passage connects the first opening to a second opening at the housing's other end. The interior passage allows the crimp tail to pass through the housing. The second opening forms a shoulder so that the crimp tail, after being pushed through the first opening and passage, can be rotated and seated against the shoulder. A cable seal securely holds the crimp tail against the shoulder. This provides a sealed and substantially stronger cable attachment. The connector housing is part of removable optical connector that provides environmental sealing when mated to a corresponding adapter.

22 Claims, 6 Drawing Sheets

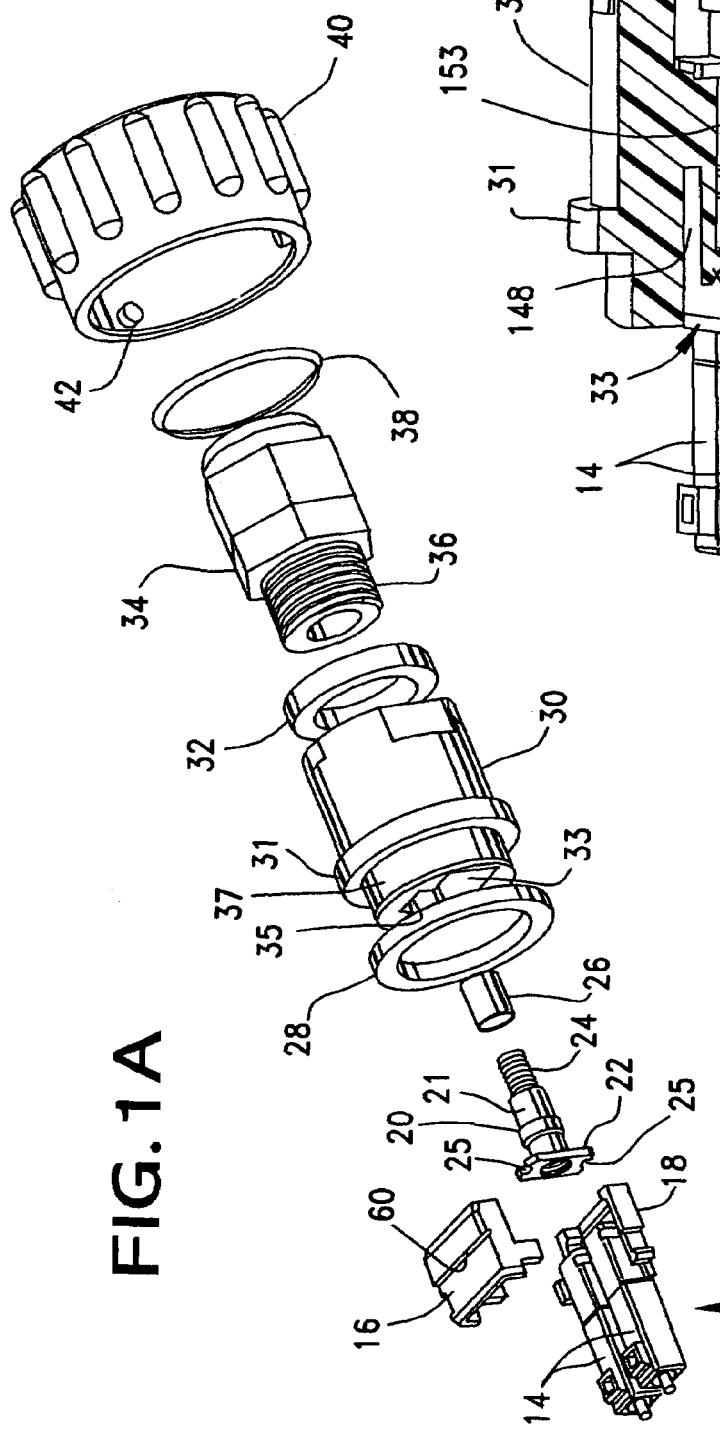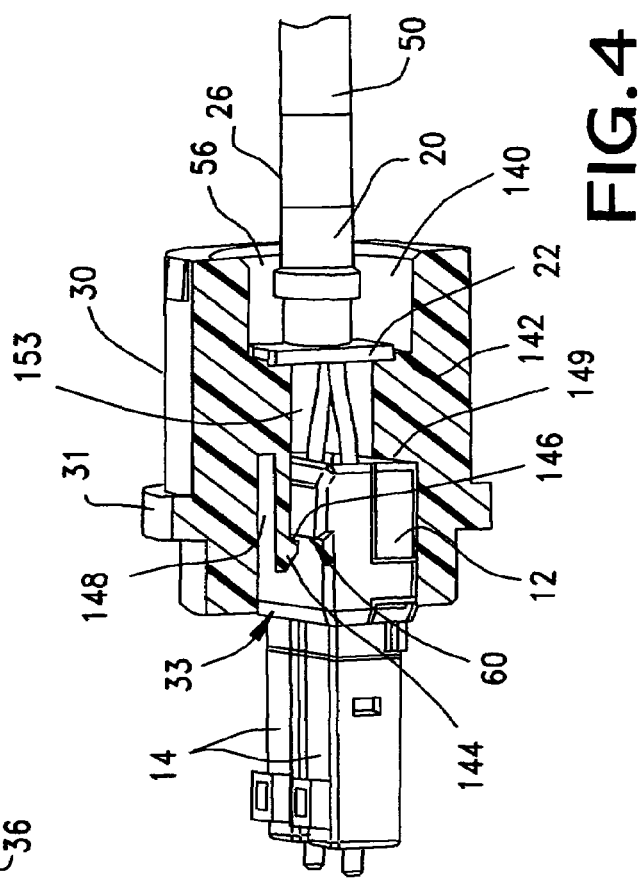

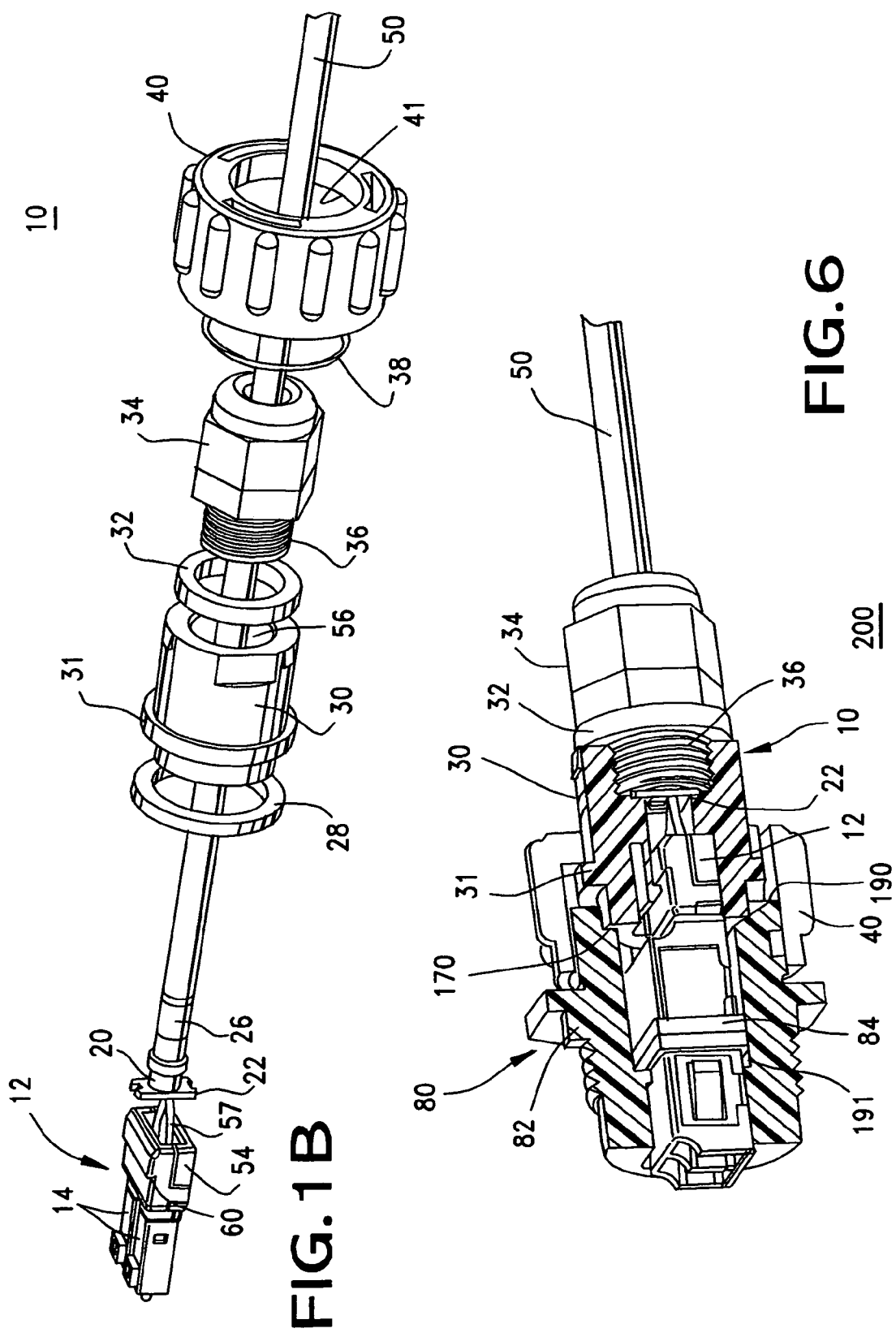

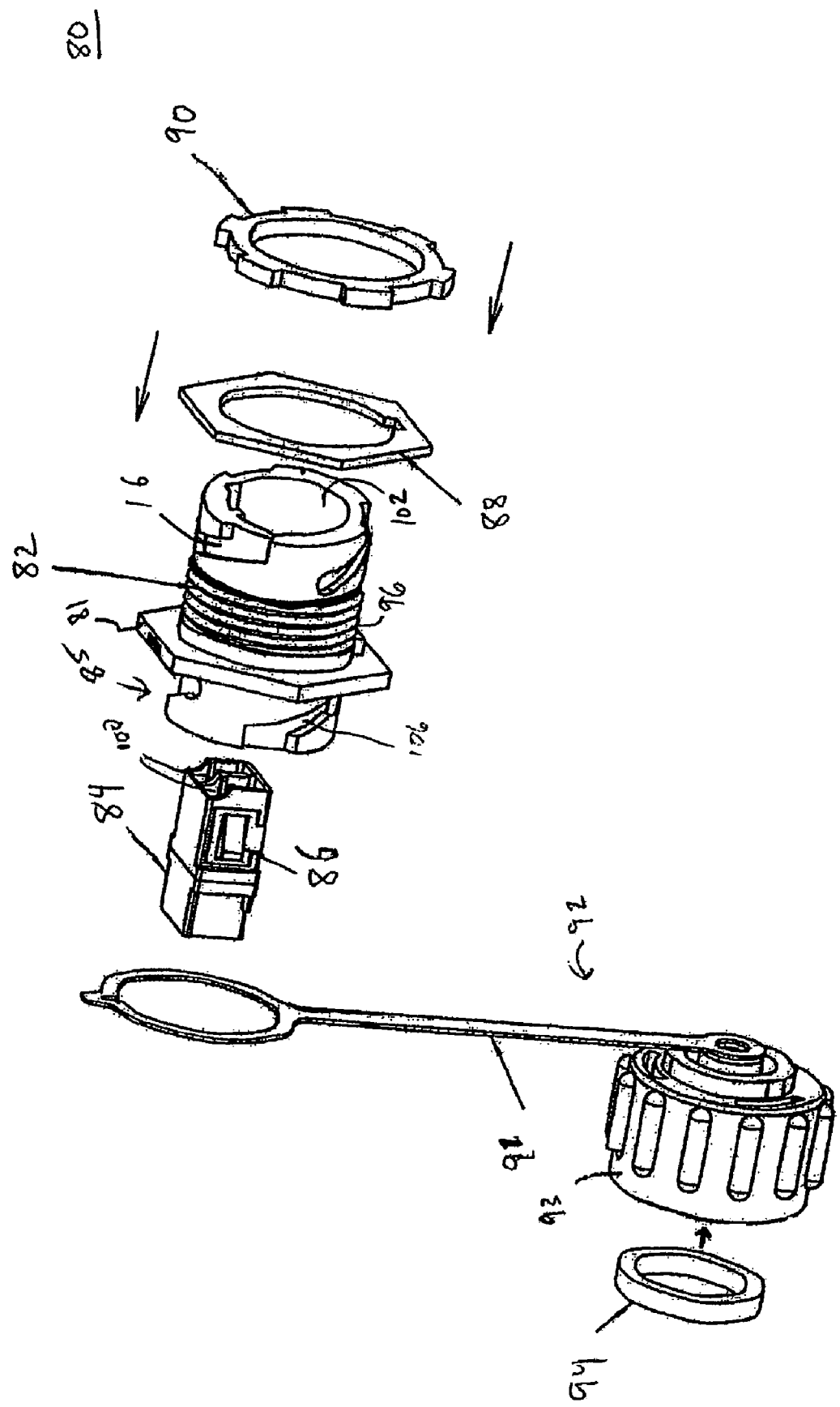

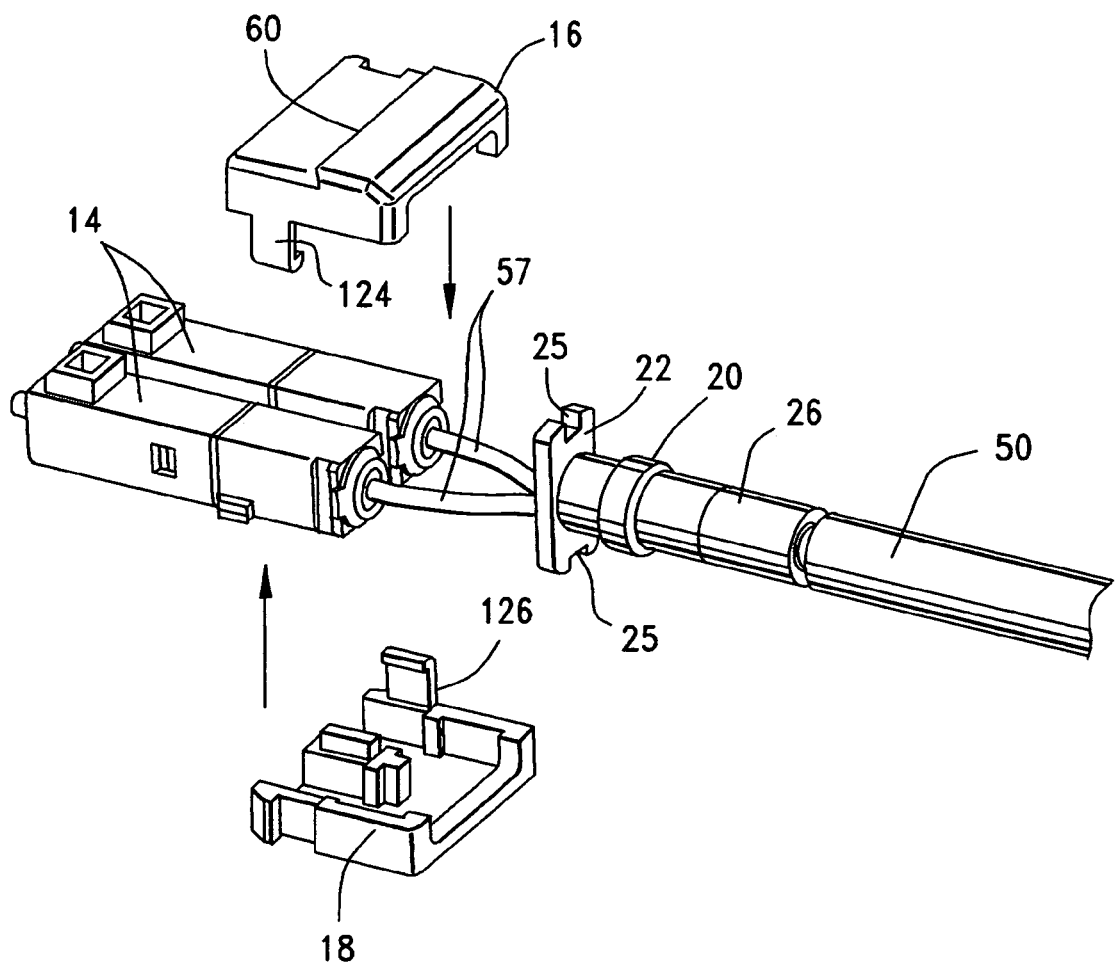
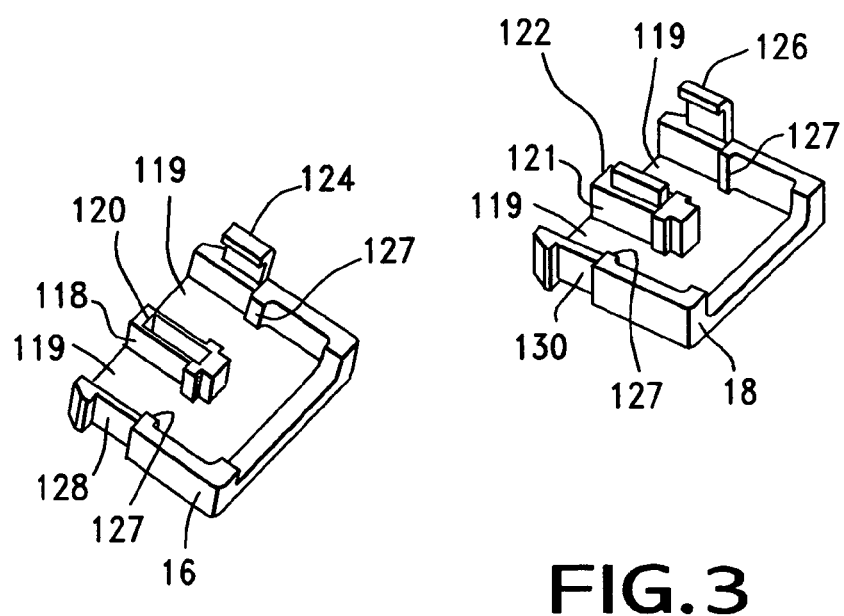
FIG.3

INDUSTRIAL OPTICAL FIBER CONNECTOR ASSEMBLY

TECHNICAL FIELD

The present invention relates generally to fiber optic connectors and adapters, and more specifically, to sealed fiber optic connector assemblies for use in harsh operating environments.

BACKGROUND

Optical fiber connectors are essential components of an optical communications systems. They are typically used to join lengths of optical fiber cables to form longer lengths, or to connect optical fibers to terminal devices, such light sources, detectors, active devices, or the like. To function effectively, an optical connector should join optical fibers with a minimum of insertion loss, and should provide mechanical stability and protection to the junction between the fibers in the operating environment. For the most part, the stability and protection of the fiber junction is determined by the connector design.

Another desirable characteristic of a connector is that its design assures relative ease of installation in the field. It is highly desirable that a connector be capable of being installed in a relative short period of time without the necessity of special skills or dexterity on the part of the installer.

Operating environments usually dictate the type of optical connector assemblies that may be used. In harsh environments, such connector assemblies need to be impervious to moisture, particulates and other contaminants that can degrade performance and/or damage the connector assembly. Standard optical connectors are generally unsuitable for use in harsh environments. For example, a standard LC-type connector does not provide a means for a weather tight seal or similar environmental protection. If such connectors are used in extreme environments, they are likely to become unreliable due to moisture and/or contamination.

There are connector assemblies currently on the market that are designed for extremely harsh environments, particularly military and aerospace applications. These military/aerospace connector assemblies are expensive, and are generally not economical for industrial applications, such as manufacturing facilities, water treatment plants, industrial plants, transportation hubs and the like, or civilian outdoor applications.

In view of the foregoing, there is a need for a ruggedized, weather-tight connector assembly that offers a lower cost alternative to military and aerospace designs and ease of installation, while meeting the performance requirements of industrial, outdoor or other harsh environment applications.

SUMMARY

It is an advantage of the present invention to provide an improved optical fiber connector assembly that fulfills the above-described needs. The connector assembly is specifically designed to protect cable connections in harsh operating environments, while offering a lower cost solution than typical military/aerospace connectors.

An aspect of the invention provides a connector housing that is uniquely configured to cooperate with a cable crimp tail and one or more terminal fiber optic connectors. The connector housing has a first opening for securely retaining the terminal fiber optic connectors. An interior passage connects the first opening to a second opening at the housing's other end. The interior passage allows the crimp tail to pass through the housing. The second opening forms a shoulder so that the crimp tail, after being pushed through the first opening and passage, can be rotated and seated against the shoulder. A cable seal securely holds the crimp tail against the shoulder. This provides a sealed and substantially stronger cable attachment. The connector housing is part of removable optical connector that provides environmental sealing when mated to a corresponding adapter.

Other aspects, features, embodiments, processes and advantages of the invention will be or will become apparent to one with skill in the art upon examination of the following figures and detailed description. It is intended that all such additional features, embodiments, processes and advantages be included within this description, be within the scope of the invention, and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale, emphasis instead being placed upon illustrating the principles of the invention. In the figures, like reference numerals designate corresponding parts throughout the different views.

FIGS. 1A-B are exploded perspective views of an optical fiber connector in accordance with an exemplary embodiment of the present invention.

FIG. 2C is an enhanced embodiment of the adapter assembly of FIG. 2B.

FIG. 3 is an exploded perspective view showing details of the optical connector sub-assembly of FIGS. 1A-B.

FIG. 4 is a partial cross-sectional view showing the optical connector sub-assembly inserted within the connector housing of FIGS. 1A-B.

FIG. 6 is partial cross-sectional view showing the mated optical fiber connector assembly in accordance with another embodiment of the invention.

DETAILED DESCRIPTION

Figure 2A:
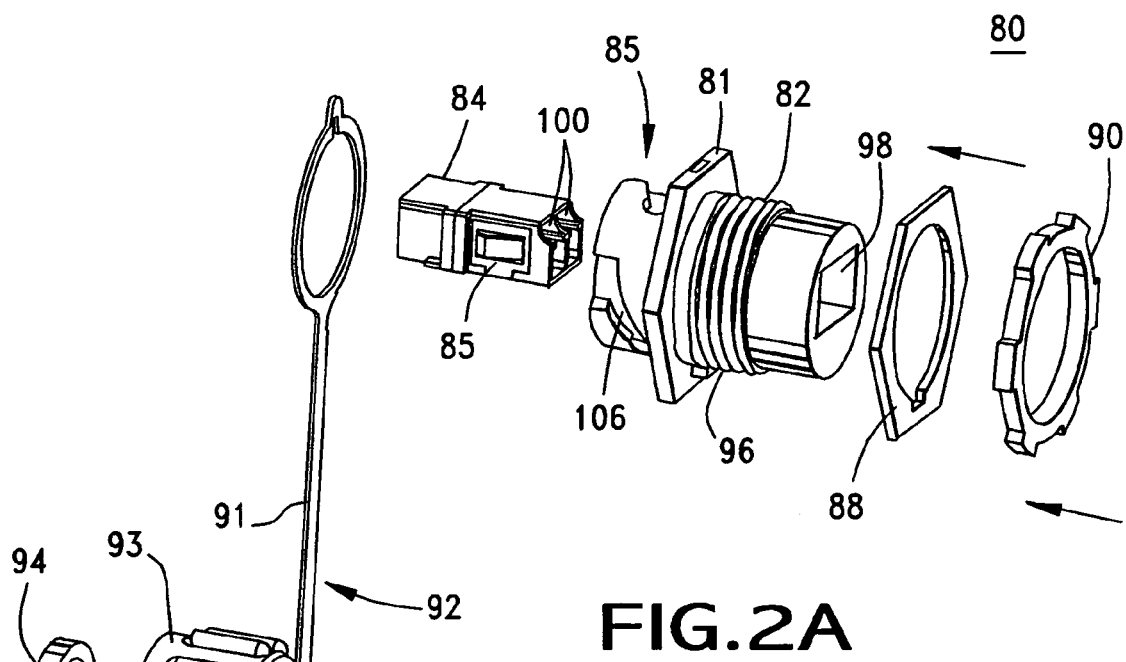
FIG. 2A is an exploded perspective view of an adapter assembly for receiving the fiber optic connector of FIGS. 1A-B.

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Turning now to the drawings, and in particular to FIG. 1A, there is illustrated an exploded perspective view of an optical fiber connector 10 in accordance with an exemplary embodiment of the present invention. The connector 10 is part of an LC duplex connector assembly 200 (see FIG. 6) that combines the high performance of an optical connection with the versatility of a rugged industrial connector to allow for easy installations and terminations in harsh environments. The connector assembly 200 features push-pull insertion and a bayonet-style mechanical latch to ensure an environmentally sealed optical connection in one step. The connector assembly 200 is designed for use in harsh environments, particularly where the Ethernet protocol is used. It is suitable for indoor and outdoor applications, including manufacturing facilities, water treatment plants, industrial plants, transportation hubs, high electromagnetic interference (EMI) and radio frequency interference (RFI) areas, medical equipment applications, telecommunications/CATV applications, such as FTTx connections, mobile broadcasting, and the like.

The removable connector 10 provides sealing between both the adapter mating surface and the cable exit from the connector. The connector 10 includes an optical connector sub-assembly 12, a crimp tail 20, a crimp tube 26, a connector housing 30, a cable seal 34, an adapter coupling ring 40, o-rings 28,32 and a spring washer 38.

The optical connector sub-assembly 12 includes a top clip 16, bottom clip 18 and a pair of optical connectors 14 mounted side-by-side within the assembled clips 16,18. The optical connectors 14 terminate optical fibers and can be any suitable type of connector for providing this function.

The top clip 16 includes a latch receiving means, such as a lateral step 60, formed on its upper surface for engaging a latch mechanism internal to the connector housing 30. The cooperating internal latch mechanism and lateral step 60 allow the sub-assembly 12 to be secured into the housing 30, as is discussed in greater detail below in connection with FIG. 4.

The crimp tail 20 includes a tubular body 21 and a crimp tail flange 22, such as a pair of opposing generally rectangular flanges, extending perpendicularly from the tubular body 21. When the connector 10 is assembled, optical fibers 57 pass through the tubular body 21 to be terminated by the optical connectors 14. The tubular body 21 includes a corrugated neck 24 where the sheathing and/or strengthening members of an optical cable can be securely fastened by sliding the crimp tube 26 over them and then crimping the tube 26 using, for example, a manual crimping tool. Alignment notches 25 are formed at the ends of the flanges. The alignment notches 25 can be of different sizes or the same size. The crimp tail 20 and crimp tube 26 are preferably made of metal, such as aluminum.

Although preferably implemented as rectangularly shaped opposing flanges, the crimp tail flange 22 can have other suitable shapes and configurations.

During assembly of the connector 10, the rectangular crimp tail 20 is connected to the cable and then inserted through first opening 33 of the connector housing 30. The connector housing 30 is formed such that when the tail 20 is rotated it engages the surrounding walls of the housing 30 and cannot be pulled out without rotating the tail 20 back to its original orientation.

The connector housing 30 includes a generally rectangular first opening 33 configured to receive the optical connector sub-assembly 12. An upper notch 35 is formed at the top of the opening 33. The notch 35 allows a suitable instrument, such as a small screwdriver, to be inserted therein so that the optical connector sub-assembly 12 can be released from the housing 30 after it has been inserted. The release operation is described in greater detail below in connection with FIG. 4.

The connector housing 30 also has an annular flange 31 extending outwardly from its exterior. The annular flange 31 provides a stop and bearing surface for the adapter coupling ring 40 when it is fitted around the connector housing 30.

The o-ring 28 fits over the front exterior portion 37 of the housing 30 and against the flange 31 to provide an environmental seal when the connector 10 is mated with its corresponding adapter.

The cable seal 34 is mated to a second, rear opening 56 (shown in FIG. 1B). The second opening 56 includes a recessed space having threaded side walls for receiving the threaded portion 36 of the cable seal 34. As will be discussed in greater detail below, when inserted into the housing 30, the cable seal 34 seals the second opening 56, seals the cable 50 and secures the crimp tail 20 to the housing 30. The o-ring 32 ensures tight seal between the housing 30 and cable seal 34. The cable seal 34 also provides strain relief to the attached optical cable 50. The cable seal 34 is preferably a standard commercially-available part.

Figure 2B:
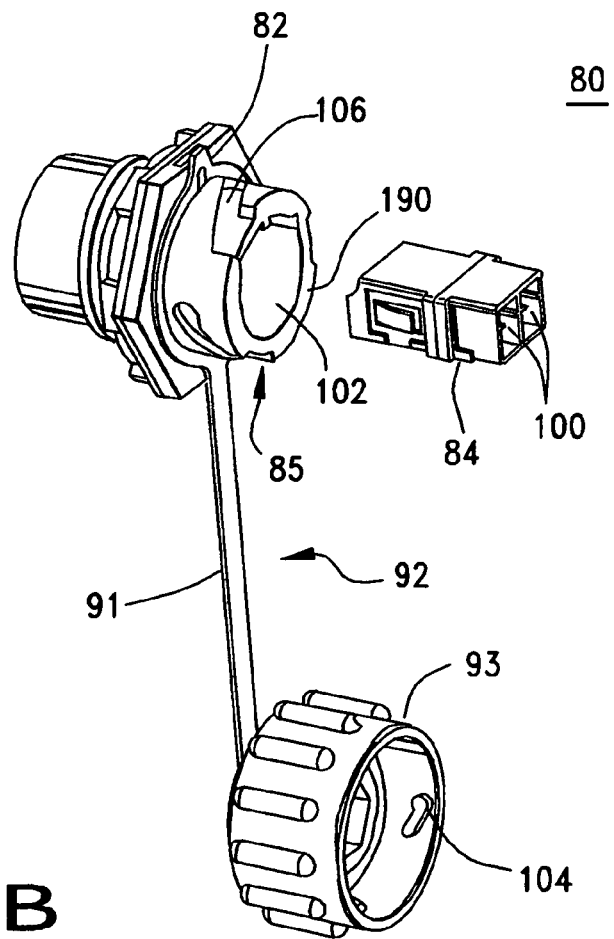
FIG. 2B is a second perspective view of the adapter assembly of FIG. 2A.

The adapter coupling ring 40 includes lugs 42 that permit a conventional bayonet-style latch attachment to an adapter 80 (see FIGS. 2A-B). The optional spring washer 38 provides a biasing force between the housing flange 31 and the back wall 41 of the coupling ring 40 when the connector 10 is attached to the adapter 80.

The housing 30, cable seal 34, adapter coupling ring 40 and portions of the optical connector sub-assembly 12 are each preferably composed of a suitable thermoplastic material, so as to be light weight and durable. These parts may be fabricated using any number of suitable methods, but they are preferably molded using well known injection molding techniques.

The housing 30 is preferably of unitary (single-piece) construction so as to improve the environmental seal of the connector assembly.

FIG. 1B is a second perspective view of the optical fiber connector 10 of FIG. 1A, partially attached to a fiber optic cable 50. The cable 50 carries a pair of optical fibers 57, which are terminated by the optical connectors 14. The cable 50 can carry any suitable type and number of optical fibers, including multi-mode and/or signal mode fibers.

FIG. 2A is an exploded perspective view of a bulkhead adapter assembly 80 for mating with the fiber optic connector 10 of FIGS. 1A-B. The assembly 80 includes an adapter housing 82 having a bayonet-style locking mechanism 106, an LC duplex adapter 84, a gasket 88, a lock nut 90, and dust cap assembly 92. The adapter assembly 80 has a sealed panel feed-thru design for ease of installation into enclosures and equipment panels. It can be mounted directly into a panel cutout to serve as a sealed feed-thru.

The LC duplex adapter 84 has a pair of side-by-side channels for receiving the terminating optical connectors 14 of the connector 10. The LC duplex adapter 84 snaps into the channel 98 formed in the adapter housing 82. Mounting plates 86 on both sides of the duplex adapter 84 include protruding resilient arms for engaging corresponding latching indents (not shown) formed on the interior side walls of the channel 98. The cooperation of the resilient arm and indents snaps the duplex adapter 84 into a fixed position within the channel 98.

The adapter 80 can be attached to a panel by inserting the threaded portion 96 through a panel hole and tightening down the adapter bulkhead 81 with the lock nut 90. The gasket 88 provides environmental sealing between the adapter 80 and the equipment panel.

The exterior side 85 of the adapter 80 provides the conventional bayonet-style locking latch 106 for attaching the connector 10. The bayonet-style locking design can be configured to meet industry-standard sealed connector specifications. The lock 106 is preferably molded into adapter housing 82, making it more robust.

The dust cap assembly 92 includes a tether 91, an o-ring 94, and a dust cap 93 for protecting the exterior side 85 of the adapter 80 and covering the exterior opening 102 when the adapter 80 is not in use. As shown in FIG. 2B, the dust cap includes bayonet locks 104 for engaging the adapter housing 82.

The adapter housing 82 and dust cap 93 are preferably made of a thermoplastic material, so as to be light weight and durable. These parts may be fabricated using any number of suitable methods, but they are preferably molded using well known injection molding techniques.

FIG. 2C is an alternate embodiment of the bulkhead adapter assembly 80 shown in FIG. 2A. In this embodiment, in addition to the threaded portion 96, there is provided a second conventional bayonet-style locking latch 116. The bayonet-style locking design provided on both sides of the bulkhead adapter assembly 80 enables both sides of the device to be configured to meet industry-standard sealed connector specifications, resulting in a highly versatile component in a weatherproof type of system. Thus, the adapter assembly 80 may be used in situations where weatherproofing is essential for both sides of the device.

FIG. 2B is a second perspective view showing the assembled adapter 80. The exterior opening 102 is sized and configured to snuggly receive the front portion 37 of the connector housing 30.

FIG. 3 is an exploded perspective view showing details of the optical connector sub-assembly 12 of FIGS. 1A-B. The housing itself includes two inter-engaging plastic clip halves 16,18, each having two side-by-side channels 119 for receiving the optical connectors 14. Each clip half 16,18 includes an integral latch 124,126 for clipping into a mated channel 130,128 formed along the exterior of the lateral wall of the opposite clip half 16,18. The parallel channels 119 firmly hug the outer surfaces of the optical connectors 14 when the two clip halves 16,18 are clipped together. Center walls 118,121 in the interiors of the clip halve 16,18 include a protrusion 122 and mated trough 120 for aligning the clip halves 16,18. Each clip half 16,18 includes stops 127 extending from their interior walls for abutting the back ends of the optical connectors 14 to properly position the connectors 14.

Each connector 14 has an essentially square cross-section with the dimensions (a cross-section approximately 5 mm from side to side) and mating characteristics of a standard LC connector, as defined by the Fiber Optic Connector Intermateability Standard—Type LC, ANSI TIA/EIA 604-10A.

FIG. 4 is a partial cross-sectional view showing the optical connector sub-assembly 12 inserted into the connector housing 30. As shown, the first opening 33 in the housing body is configured to snuggly receive the terminating fiber optic connectors 14, more specifically, the connector sub-assembly 12. The second opening 56 at the other end of the connector housing body is configured to receive the fiber optic cable 50. An interior passage 153 through the connector housing 30 connects the first and second openings 33,56. The interior passage 153 is shaped and sized to allow the crimp tail 22 connected to the fiber optic cable 50 to pass therethrough. Preferably, the interior passage is rectangularly shaped. The second opening 56 has bore larger than the cross-sectional area of the interior passage 153. This forms a shoulder 142 and a recessed space 140 within the connector housing 30. The bore is large enough so that the crimp tail 20 can be rotated within the recessed space 140 and its flanges 22 seated against the shoulder 142. The cable seal 34 can then be screwed into the recess 56 to secure the crimp tail flanges 22 against the shoulder, and thus, secure the fiber optic cable 50 to the connector housing 30.

Nearer the first opening 33, a latch mechanism 144 is formed within the interior passage 153 for securing the terminating optical connectors 14 within the first opening 33. The latch mechanism 144 includes a resilient extension 146 aligned along the axis of the connector housing 30 within the interior passage 153. The resilient extension includes an enlarged, shaped, free end for engaging the lateral step 60 of the top clip 16 of the connector sub-assembly to lock the connector sub-assembly 12 into place within the connector housing 30, with the sub-assembly's back end firmly stopped against a wall 149 formed within the passage 153. As shown, the lateral step 60 can included an angled step face for mating with a similarly angled face on the extension end to improve the reliability of the mating of the sub-assembly 12 and connector housing 30.

To release the connector sub-assembly 12 after insertion, a small instrument, such as a small screwdriver, can be inserted into the upper notch 35 (see FIG. 1A) of the first opening 33 to push the free end of the resilient extension 146 up into the gap 148, whereby disengaging the latching faces of the resilient extension 146 and lateral step 60.

Figure 5:
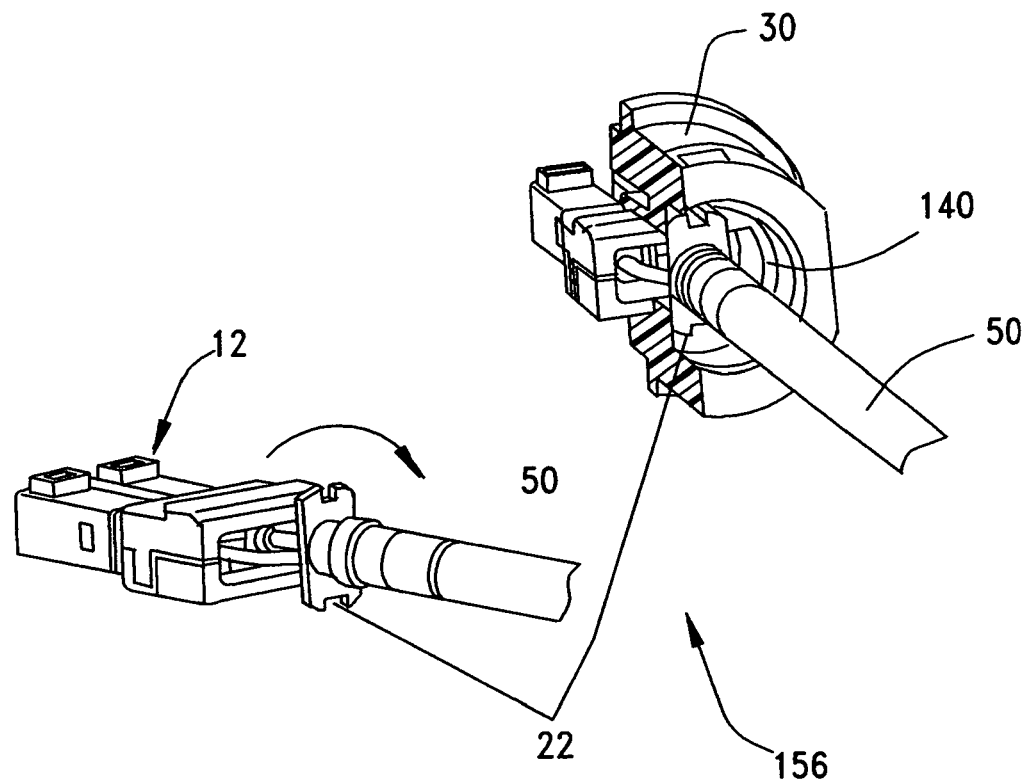
FIG. 5 presents several views illustrating the rotational action of the crimp tail within the connector housing.

FIG. 5 presents several views illustrating the rotational action of the crimp tail 20 within the connector housing 30. When the crimp tail is in the horizontal position 155, the connector housing 30 can be slid down the cable 50, over the crimp tail 20 to securely lock the connector sub-assembly 12 into place within the housing 30. In this position, the crimp tail 20 passes through the housing 30 into the recessed space 140.

After the housing 30 is slid over, the crimp tail 20 can be rotated into a vertical position 156. In this position, the crimp tail 20 can not be pulled back through the connector housing 30 toward the first opening 33. The cable seal 34 can then be screwed into the housing 30 to squeeze the crimp tail flanges 22 against the housing shoulder 142. This provides a reliable and strong attachment of the cable 50.

The housing shoulder 142 can have indentations 160 formed therein to receive the crimp tail flanges 22 so that the flanges 22 are flush with the surface of the shoulder 142 when the crimp tail 20 is seated against the shoulder 142. The indentations can be in the general outline of the flanges 22. The indentations can include raised portions corresponding to the alignment notches 25 so that the crimp tail 20 can be positively aligned in a desired orientation when seated.

The alignment notches 25 can have different sizes (one larger and the other smaller), with their respective raised portions having corresponding sizes, to specifically align the crimp tail 20 in a single orientation when seated against the shoulder 142.

FIG. 6 is partial cross-sectional view showing the mated optical fiber connector assembly 200 in accordance with another embodiment of the invention. The channel 98 (is not shown in FIG.6) has formed therein a circumferential wall 191 that acts as a stop against extending portions of the LC duplex adapter 84 to properly position the duplex adapter 84 within the housing 82. The adapter housing 82 includes an annular shoulder 170 formed within the exterior opening 102. The shoulder 170 is positioned within the opening 102 so that it acts as a positive stop against the front end of the connector housing 30 when the connector 10 and adapter 80 are mated together. When mated, the front o-ring 28 (not shown in FIG. 6) of the connector 10 engages the adapter mating surface 190 to provide an environmentally sealed connection.

The preceding detailed description has illustrated the principles of the invention using a specific implementation of a duplex LC-type connector assembly 200. However, the invention is not limited to this particular implementation. For example, the inventive principles disclosed herein can be implemented in many other types of connector systems, such as simplex connector systems or connector systems having different shapes, sizes and mating characteristics. It is understood that the optical connector assembly 200 could be configured to contain any suitable number of optical fibers and terminal connectors without departure from the invention. Further, other types of terminating optical connectors, such as SC-type connectors, MPO or the like, can be used without departing from the principles of the invention.

Therefore, while one or more specific embodiments of the invention have been described, it will be apparent to those of ordinary skill in the art that many more embodiments are possible that are within the scope of this invention. Further, the foregoing detailed description and drawings are considered as illustrative only of the principles of the invention. Since other modifications and changes may be or become apparent to those skilled in the art, the invention is not limited the exact construction and operation shown and described, and accordingly, all suitable modifications and equivalents are deemed to fall within the scope of the invention.

What is claimed is:

1. A connector housing for protecting one or more fiber optic connectors terminating a fiber optic cable, comprising:
    a single-piece unitary housing body;
    a first opening formed in one end of the housing body configured to receive the terminating fiber optic connectors;
    a second opening formed in the other end of the housing body configured to receive the fiber optic cable;
    an interior passage through the housing body connecting the first and second openings, the interior passage being shaped and sized to allow a crimp tail connected to the fiber optic cable to pass therethrough; and
    a latch mechanism formed within the interior passage for securing the terminating optical connectors within the first opening, the latch mechanism having a resilient extension axially aligned within the interior passage for engaging a corresponding latch receiving means attached to the terminating fiber optic connectors;
    wherein the second opening has bore larger than the cross-sectional area of the interior passage forming a shoulder and a recessed space within the housing body so that the crimp tail can be rotated within the recessed space and seated against the shoulder for securing the fiber optic cable to the connector housing.

2. The connector housing of claim 1, wherein the latch mechanism has a structure for releasably securing the terminating optical connectors within the first opening.

3. The connector housing of claim 1, wherein the interior passage has a substantially rectangular cross-section.

4. The connector housing of claim 1, wherein the recessed space has a threaded wall for receiving a cable seal.

5. The optical fiber connector of claim 4, further comprising a mechanical latch.

6. The connector housing of claim 1, wherein the shoulder has an indentation formed therein to receive flanges of the crimp tail so that the flanges are flush with the surface of the shoulder when the crimp tail is seated against the shoulder.

7. The connector housing of claim 1, further comprising an adapter mated annular flange extending outwardly from the exterior of the connector housing.

8. The connector housing of claim 1, wherein the terminating optical connectors are selected from the group consisting of an LC connector, an SC connector, a dual LC connector and any suitable combination of the foregoing.

9. The connector housing of claim 1, wherein the recessed space has a mechanical latch.

10. An optical fiber connector for protecting one or more fiber optic connectors terminating a fiber optic cable, comprising:
    a crimp tail having a tubular body for attaching to the fiber optic cable and a flange extending radially from the tubular body;
    a connector housing having a first opening formed in one end for receiving the terminating fiber optic connectors, a second opening formed in the other end of the housing for receiving the fiber optic cable, and an interior passage connecting the first and second openings, the interior passage being shaped and sized to allow the crimp tail to pass therethrough, wherein the second opening forms a shoulder such that after passing through the interior passage, the crimp tail can be rotated to seat the crimp tail flange against the shoulder;
    a terminal connector housing configured to receive the terminating optical connectors and to be inserted into the first opening, the terminal connector housing also having a latch receiving means formed thereon; and
    a latch mechanism formed within the interior passage for securing the terminal connector housing within the first opening, the latch mechanism having a resilient extension axially aligned within the interior passage for engaging the latch receiving means when the terminal connector housing is inserted into the first opening.

11. The optical fiber connector of claim 10, further comprising:
    a cable seal mated to the second opening for sealing the optical cable to the optical fiber connector and for pressing the seated crimp tail flange against the shoulder, whereby securing the crimp tail to the connector housing.

12. The optical fiber connector of claim 10, wherein the terminal connector housing includes:
    a top clip having the latch receiving means formed thereon; and
    a bottom clip mated to the top clip for holding the terminating optical connectors in a predetermined arrangement.

13. The optical fiber connector of claim 10, wherein the terminal connector housing is a duplex housing having a pair of channels for holding two terminating optical connectors side-by-side in place next to each other.

14. The optical fiber connector of claim 10, wherein the crimp tail flange includes a pair of opposing generally rectangular flanges extending from the crimp tail body.

15. The optical fiber connector of claim 14, wherein each rectangular flange has an alignment notch formed at its end.

16. The optical fiber connector of claim 15, wherein the alignment notches have different sizes to positively align the crimp tail in a single orientation when seated against the shoulder.

17. The optical fiber connector of claim 10, further comprising an adapter coupling ring fitted around the connector housing.

18. The optical fiber connector of claim 17, wherein the connector housing includes an annular flange extending outwardly from its exterior.

19. The optical fiber connector assembly of claim 18, further comprising an o-ring fitted around the exterior of the connector housing and abutting the annular flange for providing a seal between a mated adapter and the connector.

20. The optical fiber connector of claim 10, wherein the terminating optical connectors are selected from the group consisting of an LC connector, an SC connector, a dual LC connector and any suitable combination of the foregoing.

21. The optical fiber connector of claim 10, included in optical fiber connector assembly that further comprises an adapter configured to receive the optical fiber connector.

22. The optical fiber connector of claim 10, wherein the second opening has bore larger than the cross-sectional area of the interior passage, whereby forming a recessed space within the connector housing that contains the shoulder.

* * * * *